P. F. HUGHES.
SUGAR CANE MILL.
APPLICATION FILED SEPT. 15, 1915.
1,227,145.
Patented May 22, 1917.
2 SHEETS—SHEET 1.
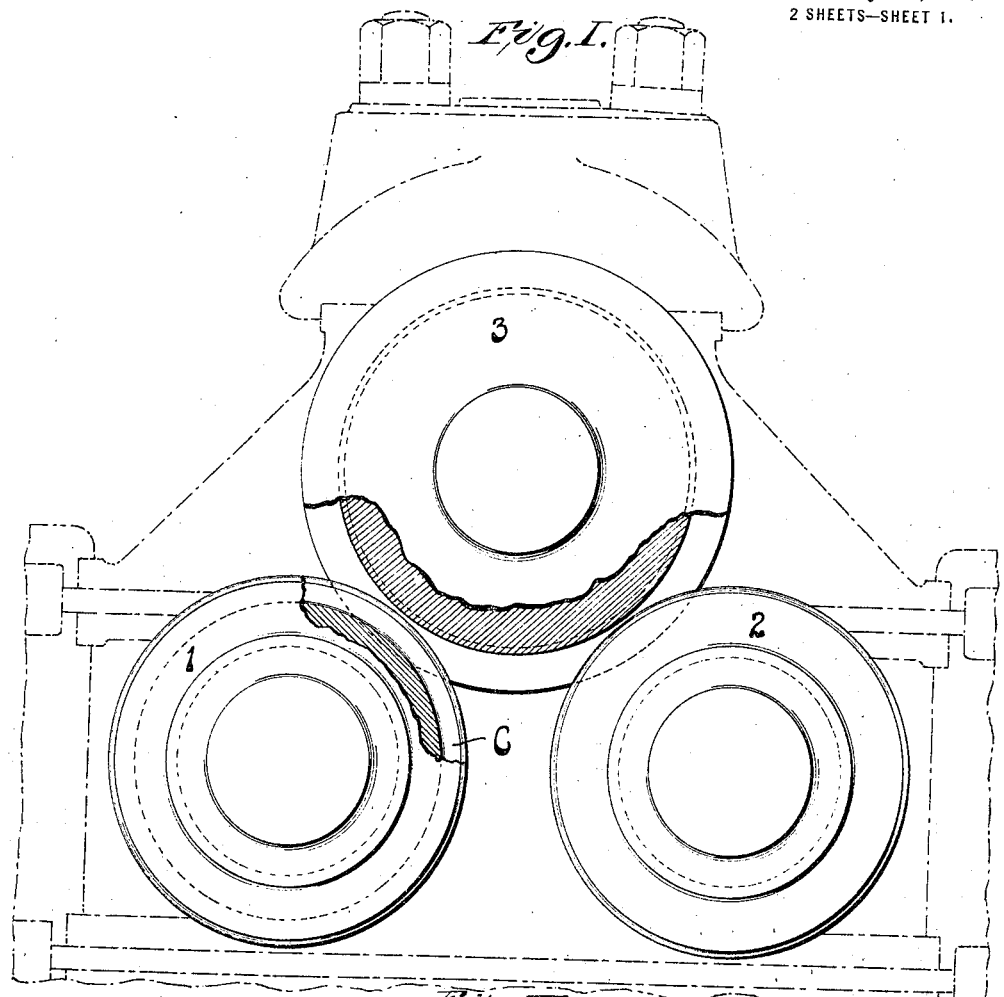
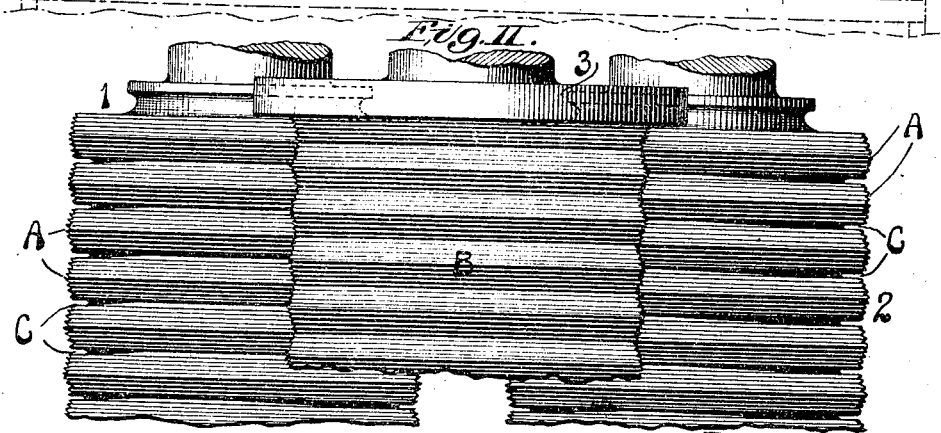
Inventor:
P. F. Hughes

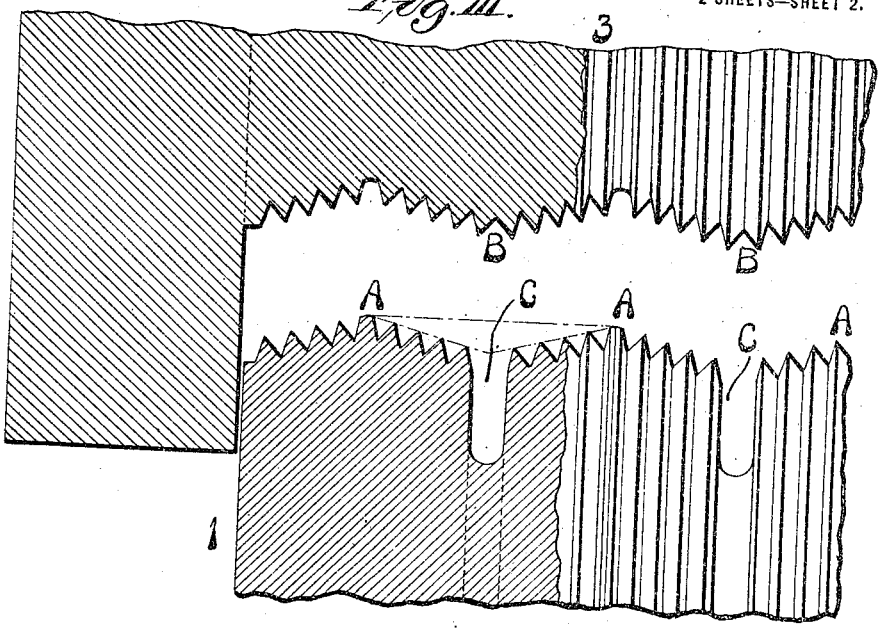
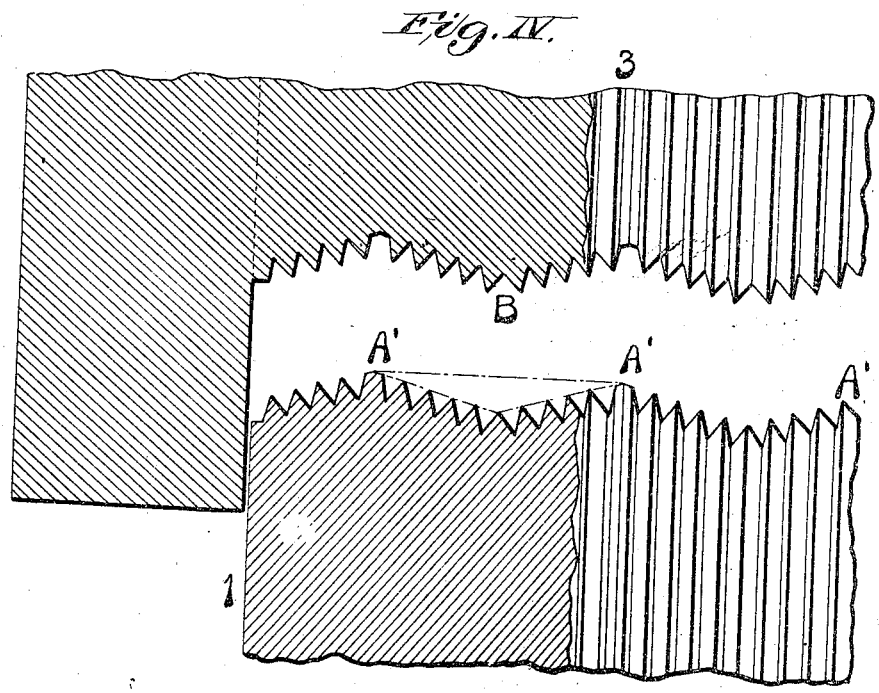

UNITED STATES PATENT OFFICE.

PETER F. HUGHES, OF PERTH AMBOY, NEW JERSEY, ASSIGNOR TO THE CUBAN-AMERICAN SUGAR COMPANY, A CORPORATION OF NEW JERSEY.

SUGAR-CANE MILL.

1,227,145. Specification of Letters Patent. Patented May 22, 1917.

Application filed September 15, 1915. Serial No. 50,744.

*To all whom it may concern:*

Be it known that I, PETER F. HUGHES, a citizen of the United States, residing at Perth Amboy, in the county of Middlesex, State of New Jersey, have invented a new and useful Improvement in Sugar-Cane Mills, of which the following is a full, clear, and exact description, reference being had to the accompanying drawings, forming a part of this specification.

My invention relates to a sugar cane mill, or more specifically stated, to a sugar cane mill roller. The invention has for its object to so produce a sugar cane mill roller that the juices expressed from cane passing between said roller and a companion roller will be discharged readily and quickly from the point at which the pressure is exerted upon the cane, and from the roller surface in front of such point, instead of being carried between the pressure rollers, or becoming banked in front of such rollers.

Figure I is an end elevation of a sugar cane mill having rollers therein constructed in accordance with the present invention, the ends of two of the rollers being shown partly in cross section.

Fig. II is a top or plan view of portions of the rollers shown in Fig. I.

Fig. III is an enlarged view of a fragment of one of the lower rollers and a fragment of the top roller, the rollers being shown partly in elevation and partly in longitudinal section.

Fig. IV is a view similar to Fig. III illustrating a modification.

In Fig. I of the accompanying drawings I have shown three rollers in triangular arrangement as they appear when mounted in a cane mill housing. This arrangement is that preferred in utilizing my improved rollers, and I will designate these rollers as the feed roller 1, delivery roller 2, and top pressure roller 3. The rollers 1 and 2 are similar, however, and either of these may be the feed roller and the other the delivery roller.

Each of the rollers 1 and 2 is formed with a succession of crown sections A present one after another throughout the length of the roller, the sections being arched longitudinally of the roller and the sides of the adjoining sections being in juxtaposition to each other, thereby forming circular valleys or gutters between the apex of one crown section and the apex of the next adjoining crown section. The crown sections being arched longitudinally of the roller, their apexes are farthest removed from the axis of the roller and the sides of the crown sections are nearest the axis of the roller.

The top pressure roller 3 is formed with crown sections B similar to the crown sections A upon the rollers 1 and 2, and said crown sections B are so located upon the roller 3 that they oppose the valleys or gutters between the crown sections A while the crown sections A oppose the valleys of the roller 3 between the crown sections B.

From the foregoing description it will be understood that the opposing rollers 1 and 3, and 2 and 3, have alternate convex and concave surfaces, the concave surfaces of one roller being directly opposed to the convex surfaces of the opposite roller so that the rollers 1 and 3 and the rollers 2 and 3 may approach each other in the same manner as they would if they were of the same diameter from end to end.

When sugar cane is passed between the top pressure roller 3 and the feed roller the juices expressed from the cane are permitted to flow not only circumferentially of the feed roller, but also longitudinally of said roller along the crown sections A toward the bases of the gutters between the adjoining crown sections. The juices, therefore, collect in the gutters between the crown sections, forming rivulets in which the juices flow much more quickly than they would in flowing in thin films having a course of passage circumferentially of the roller only. The more rapid escape of the juices is due to the speedy collection of the juices in increased volume in the gutters between the crown sections A.

As the bagasse passes between the top pressure roller 3 and the delivery roller the juices remaining in the cane or bagasse collect in the gutters between the crown sections of said delivery roller and escape from said roller in the same manner as they escape from the feed roller.

All of the rollers are preferably grooved or ribbed circumferentially, as shown in the drawings, but if desired, the grooving of the rollers may be dispensed with.

The feed and delivery rollers may be provided with annular grooves C extending toward the axis of the roller from the bases of the gutters between the crown sections A, as shown in Figs. I to III inclusive, into which the juices flow for more speedy escape. Such grooves may, however, be dispensed with and the feed and delivery rollers may be provided with crown sections A', the bases of which join each other, as seen in Fig. IV.

It will be apparent that in the use of a cane mill containing rollers constructed in accordance with this invention the grooves upon the crown sections, where such grooves are present, may become filled with cane and bagasse and therefore the cane juices may flow readily across the tops of the ridges between the grooves in their travel longitudinally of the rollers down the sides of the crown sections when escaping from the rollers.

I claim:

A cane mill comprising a feed roller, a delivery roller and a pressure roller, each of said rollers having crown sections arched longitudinally of the roller, the crown sections of the pressure roller being arranged between the crown sections of the other rollers and the feed roller and delivery rollers being provided with annular grooves located between the crown sections thereon.

PETER F. HUGHES.

Witnesses:
R. R. HAWLEY,
BERNHARD GLATHE.